Jan. 12, 1971     M. P. HELDT     3,553,896
SPLINE LAPPING MACHINE

Filed Jan. 26, 1968     5 Sheets-Sheet 1

INVENTOR
*MICHEL P. HELDT, DECEASED*
By *ODETTE HELDT, ADMINISTRATRIX*
BY

*Barnes, Kisselle, Raisch & Choate*

ATTORNEYS

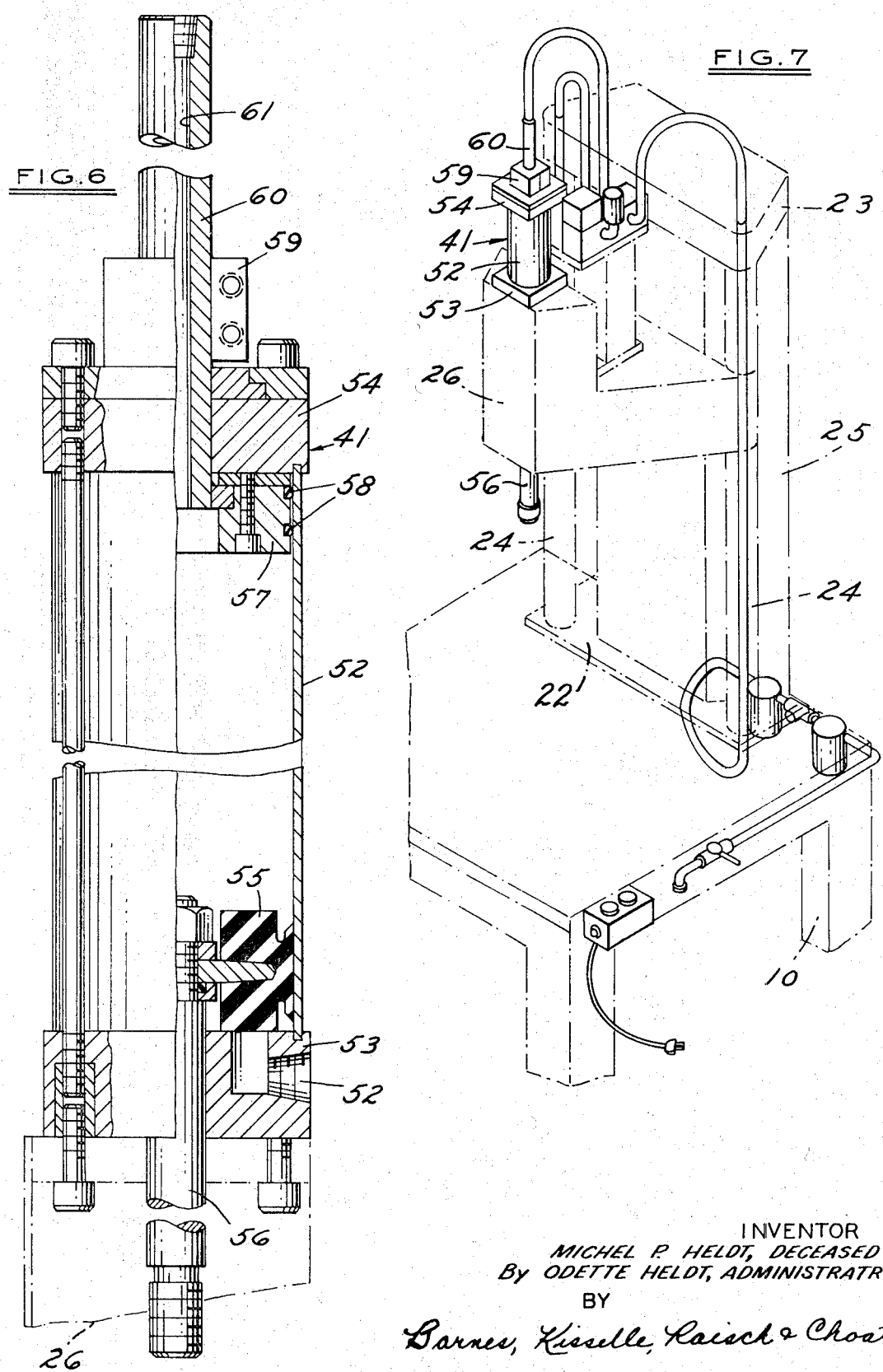

United States Patent Office 3,553,896
Patented Jan. 12, 1971

3,553,896
SPLINE LAPPING MACHINE
Michel P. Heldt, deceased, late of Detroit, Mich., by Odette Heldt, administratrix, Detroit, Mich., assignor to Delta Corporation, a corporation of Connecticut
Filed Jan. 26, 1968, Ser. No. 702,502
Int. Cl. B24b 7/00, 9/00
U.S. Cl. 51—34    14 Claims

ABSTRACT OF THE DISCLOSURE

The spline lapping machine disclosed herein comprises a base having an upright portion defining a slideway upon which a slide may be moved and clamped in position. A spline lapping tool is mounted for reciprocating motion on the slide and a fluid motor reciprocates the tool. The workpiece which is to be lapped is supported on a table on the base below the tool, the table being rotatable about a vertical axis. Means are provided for controlling the length of the reciprocating stroke of the tool support. Specifically, the reciprocating means comprises a fluid operated cylinder which has a variable stroke provided by adjusting the position of one end of the cylinder with respect to the length of the cylinder.

---

This invention relates to spline lapping machines.

In the manufacture of splines, it is common to lap the teeth of a spline to the desired final shape and dimension. This is achieved by reciprocating motion between the teeth and a tool.

Among the objects of the invention are to provide a spline lapping machine wherein the spline can be readily lapped, wherein the machine can be readily adapted to splines of different lengths, which is relatively simple in construction and accurate.

Basically, the spline lapping machine embodying the invention includes a base having an upright portion defining a slideway upon which a slide may be moved and clamped in position. A spline lapping tool is mounted for reciprocating motion on the slide and a fluid motor reciprocates the tool. The workpiece which is to be lapped is supported on a table on the base below the tool, the table being rotatable about a vertical axis. Means are provided for controlling the length of the reciprocating stroke of the tool suport. Specifically, the reciprocating means comprises a fluid operated cylinder which has a variable stroke provided by adjusting the position of one end of the cylinder with respect to the length of the cylinder.

In the drawings:

FIG. 6 is a fragmentary part sectional longitudinal view of the fluid cylinder utilized in the apparatus.

FIG. 7 is a partly diagrammatic fragmentary perspective view of the apparatus.

Figure 1:
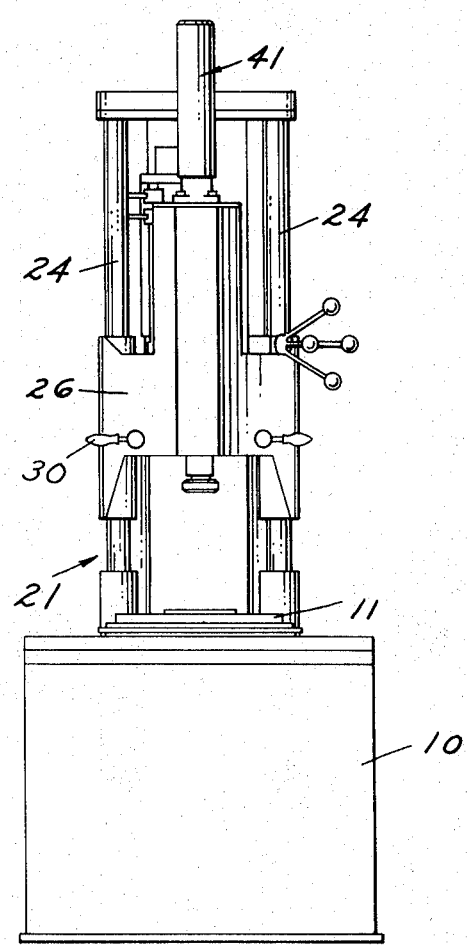
FIG. 1 is a front elevational view of the spline lapping machine embodying the invention.
Figure 2:
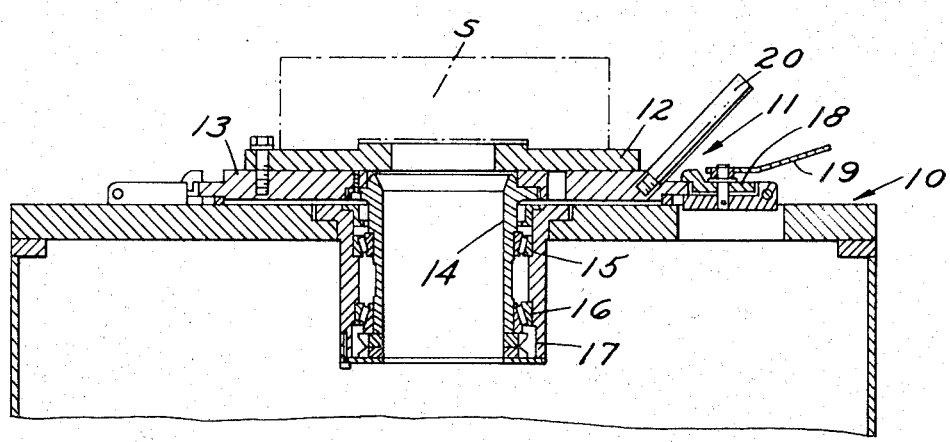
FIG. 2 is a fragmentary sectional view taken along the line 2—2 in FIG. 4.

Referring to FIG. 1 the spline lapping machine embodying the invention comprises a base 10 on which a table 11, for supporting a workpiece that is to be lapped, is mounted for rotation about a vertical axis. As shown in FIG. 2, the table 11 comprises a plate 12, which supports the workpiece which, in turn, is mounted on a plate 13 that has a post 14 fixed thereto. The post, in turn, is rotatably mounted by bearings 15, 16 in a cylinder 17 in the base. A clamp 18 manipulated by a handle 19 is provided for locking the table, if necessary. A plurality of circumferentially spaced manipulating handles 20 are provided around the periphery of the plate 13 to facilitate manipulation of the table and, in turn, the spline and thereby apply lapping pressure as the tool is reciprocated.

The base 10 includes an upright 21 that comprises a lower bracket 22 and an upper bracket 23 between which vertical shafts 24 of circular cross section extend. The upright is further given structural strength by a sheet metal member 25 (FIGS. 3 and 4) which has a generally trapezoidal cross sectional shape with the long side of the trapezoid being open and facing rearwardly.

Figure 4:
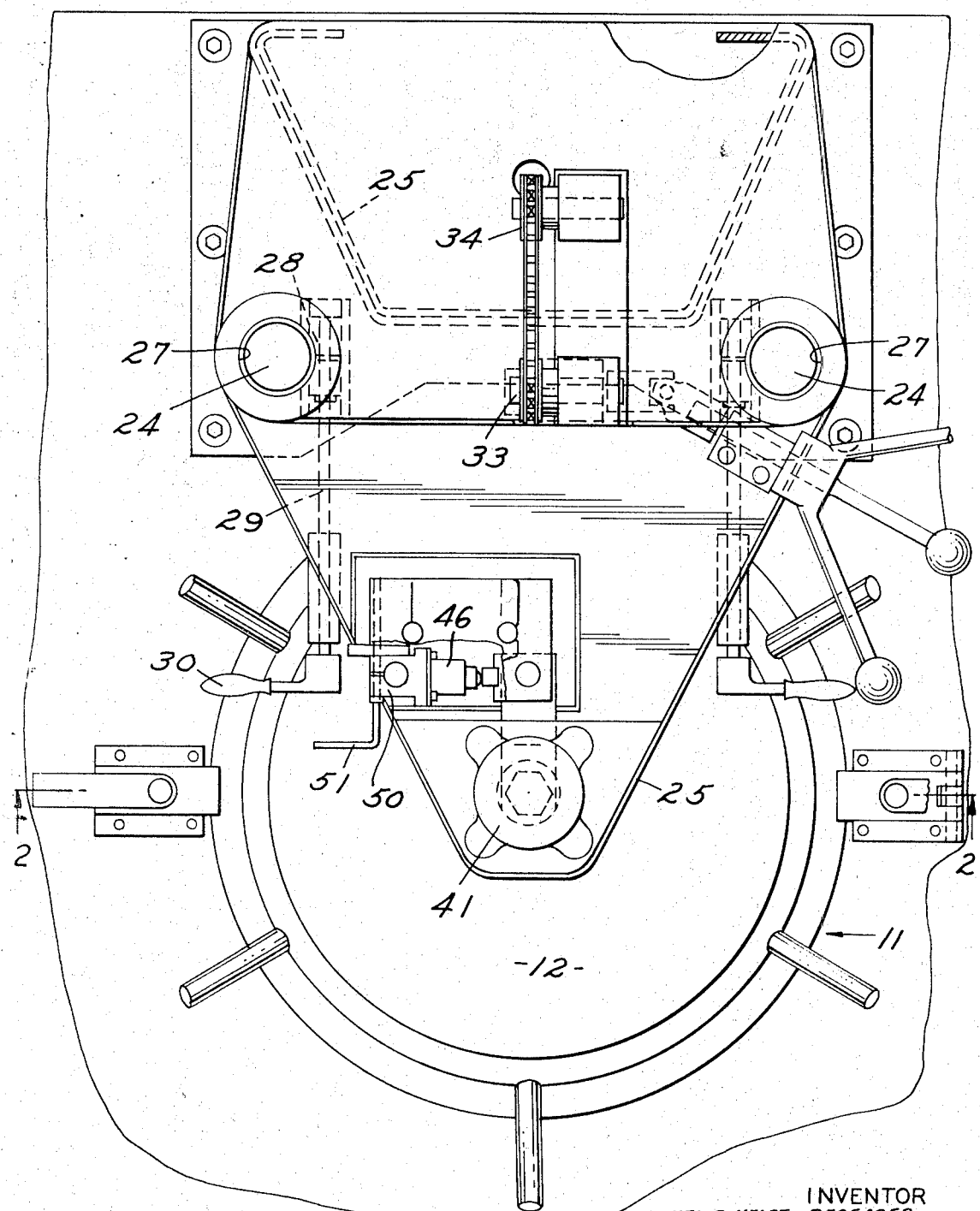
FIG. 4 is a fragmentary part sectional plan view of the machine.

A slide 26 has openings 27 therein through which the shafts 24 extend. Clamping blocks 28 are provided in the slide 26 adjacent the shafts 24 and are manipulated by rotation of rods 29 through handles 30 to clamp the slide 26 in position on the shaft 24. In order to facilitate positioning of the slide 26 on the shaft 24 the weight of the slide is counterweighted by an arrangement which includes a chain 31 fastened at one end to bracket 23 and trained over a sprocket 32 rotatably mounted on slide 26 and trained over sprockets 33, 34 rotatably mounted on bracket 23. A weight 36 is connected to the other end 35 of chain 31. As shown in FIG. 4 a handwheel is operatively connected to sprocket 32 by a universal coupling to facilitate movement of slide 26.

Figure 5:
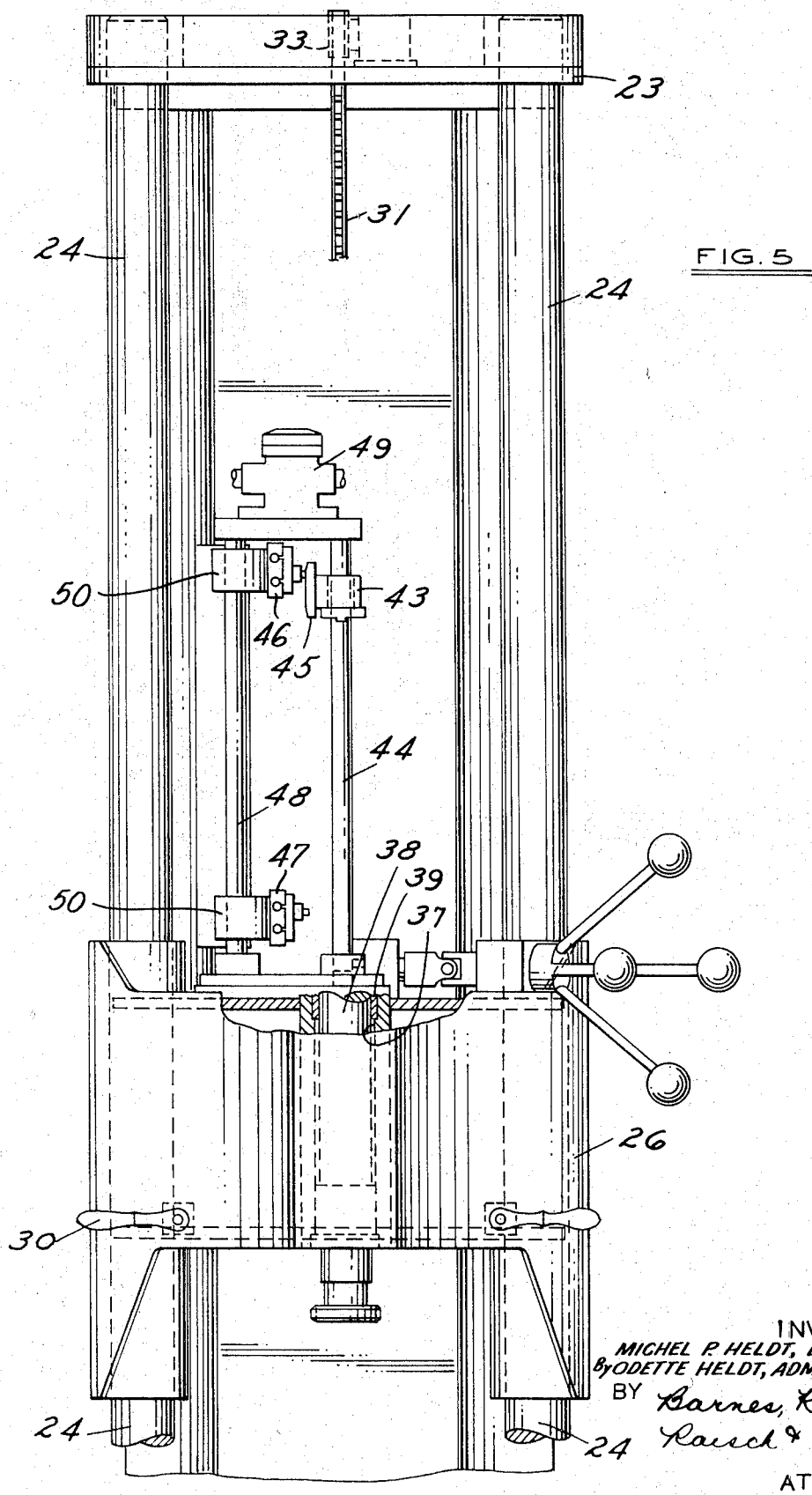
FIG. 5 is a part sectional front elevational view of the machine.

As shown in FIG. 5 the slide 26 includes a vertical opening 37 in which a spline lapping tool support 38, which supports a tool, is vertically reciprocable, the tool support 38 engaging bearing 39. The upper end of the tool support 38 is connected to the shaft 40 of a linear fluid motor 41 which is mounted on the slide 26. The operation of the fluid motor 41 reciprocates the spline lapping tool support 38 to provide the desired lapping motion.

Figure 3:
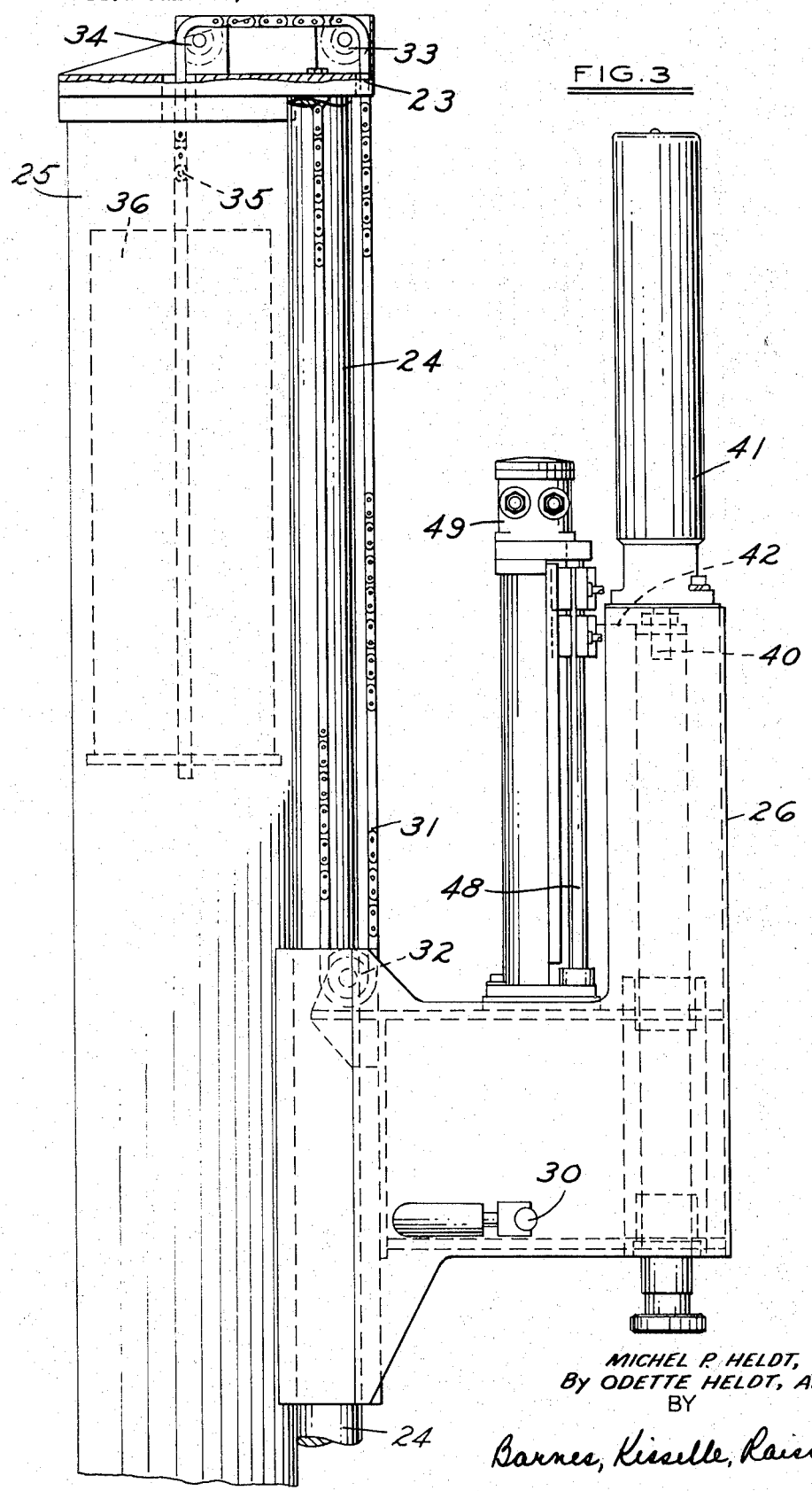
FIG. 3 is a fragmentary side elevational view of the spline lapping machine.

As shown in FIGS. 3–5, a laterally extending bar 42 is vertically reciprocable with the tool support 38 and moves a cam support 43 that, in turn, is reciprocable on a vertical rod 44. The cam support 43 supports a cam 45 that is adapted to actuate valves 46, 47 on a second rod 48. The valves 46, 47 control a four way valve that, in turn, controls the motor 41. In this fashion when fluid is supplied to the valve 49 reciprocation of the motor 41 and, in turn, the tool support 38 is achieved, the length of the stroke or reciprocation being controlled by the position of the valves 46, 47.

As shown in FIG. 4 each of the vales 46, 47 is mounted on a split bracket 50 that is vertically adjustable on the rod 48, and clamped in vertically adjusted position by manipulation of a handle 51 that is threaded between the split portions of the bracket 50 to lock the bracket in position.

As shown in FIG. 6, the motor 41 comprises a cylinder 42 having a fixed head 43 at one end and a fixed head 44 at the other. A piston 45 of resilient material such as rubber is fixed to a piston rod 46 that extends through the head 43. A movable cylinder head 47 having O-rings 48 in the periphery thereof is mounted for adjustable movement within the head 44 so that the effective length of the cylinder can be adjusted. The position of the movable head 47 is adjusted by a clamp 49. The moveable head has a shaft 50 extending through the fixed head which is gripped by the clamp 49. An axial passage 51 in shaft 50 provides for ingress and egress of fluid to the upper end of the cylinder while a passage 52 in the head 43 provides ingress and egress of fluid to the area below the piston. The piston rod 46 is connected to the tool support 38.

In use, the spline to be lapped is supported on the table 11, the slide 26 is adjusted to bring the tool support into position so that the lapping tool mounted thereon, not shown, is adjacent to spline S. Finally, the valves 46, 47 are adjusted to provide the desired reciprocating lapping stroke.

When fluid is supplied, the motor 41 reciprocates the spline lapping tool support 38 and, in turn, the tool. The operator applies pressure to the teeth by manulation of the handles 20 so that as the tool support with the tool thereon reciprocates, the desired lapping is achieved.

The use of the movable head 47 within the cylinder 41 permits large changes in the length of the stroke of the tool support 38. The use of a resilient piston 45 insures that damage to the piston will be prevented as the piston engages the movable head 47 and fixed head 43 in its reciprocating movement.

What is claimed is:

1. In a spline lapping machine, the combination comprising a base,
   a workpiece supporting table rotatively mounted on said base for rotation about a substantially vertical axis,
   said base having an upright portion defining a slideway,
   a slide vertically reciprocable on said slideway,
   means for locking said slide in vertically adjusted position on said slideway,
   a spline lapping tool support,
   a spline lapping tool on said support,
   means on said slide for guiding said tool support for reciprocating vertical movement,
   and means for reciprocating said tool support on said slide.

2. The combination set forth in claim 1 wherein said slideway comprises a pair of vertical posts, said slide having openings therein through which said posts extend.

3. The combination set forth in claim 1 including means for counterbalancing the weight of said slide thereby facilitating vertical adjustment of said slide when said locking means are released.

4. The combination set forth in claim 3 wherein said counterweight means comprises a flexible member connected at one end to said slide and a counterweight fastened to the other end thereof.

5. The combination set forth in claim 4 including manually operable means engaging said flexible member for facilitating the movement of said slide.

6. The combination set forth in claim 1 wherein said means for reciprocating said tool support comprises a fluid motor.

7. The combination set forth in claim 6 including valve means operable by reciprocation of said tool support for reversing the operation of said fluid motor.

8. The combination set forth in claim 1 wherein said upright portion of said base is made of sheet metal having a generally trapezoidal cross section with the long side of the trapezoid being open.

9. In a spline lapping machine the combination comprising a base,
   a workpiece supporting a table rotatively mounted on said base for rotation about a substantially vertical axis,
   said base having an upright portion including a pair of vertical posts defining a slideway,
   said upright portion of said base being made of sheet metal having a generally trapezoidal cross section with the long side of the trapezoid being open,
   a slide vertically reciprocable on said posts,
   means for clamping said slide in vertically adjusted position on said posts,
   means for counterbalancing the weight of said slide thereby facilitating vertical adjustment of said slide when said clamping means are released,
   a spline lapping tool support,
   a spline lapping tool on said support,
   means on said slide for guiding said tool support for reciprocating vertical movement,
   and means for reciprocating said tool support on said slide.

10. The combination set forth in claim 9 wherein said counterweight means comprises a flexible member connected at one end to said slide having a counterweight fastened to the other end thereof.

11. The combination set forth in claim 9 wherein said means for reciprocating said tool support comprises a fluid motor.

12. The combination set forth in claim 11 including valve means operable by reciprocation of said tool support for reversing the operation of said fluid motor.

13. The combination set forth in claim 10 wherein said fluid motor comprises a cylinder having a movable head at one end thereof,
    means for holding said head in predetermined longitudinal position relative to said cylinder thereby adjusting the length of the stroke of said motor.

14. The combination set forth in claim 13 wherein said piston is made of resilient material.

References Cited

UNITED STATES PATENTS

| | | | |
|---|---|---|---|
| 3,097,453 | 7/1963 | Swanson | 51—34 |
| 3,161,992 | 12/1964 | Gentry et al. | 51—34 |
| 3,333,366 | 8/1967 | Czubak et al. | 51—67 |
| 2,377,310 | 6/1945 | Caldwell et al. | 51—34.3 |
| 2,301,111 | 11/1942 | Cuppers et al. | 51—34.3 |
| 2,787,867 | 4/1957 | Klein | 51—34.3 |

JAMES L. JONES, Jr. Primary Examiner

U.S. Cl. X.R.

51—67